US006168447B1

(12) United States Patent
Stepniak et al.

(10) Patent No.: US 6,168,447 B1
(45) Date of Patent: Jan. 2, 2001

(54) LOADBREAK CONNECTOR ASSEMBLY WHICH PREVENTS SWITCHING FLASHOVER

(75) Inventors: Frank M. Stepniak, Andover; Larry N. Siebens, Port Murray, both of NJ (US)

(73) Assignee: Thomas & Betts International, Inc., Sparks, NV (US)

( * ) Notice: Under 35 U.S.C. 154(b), the term of this patent shall be extended for 0 days.

(21) Appl. No.: 09/287,915

(22) Filed: Apr. 7, 1999

Related U.S. Application Data

(63) Continuation-in-part of application No. 08/902,749, filed on Jul. 30, 1997.

(51) Int. Cl.[7] .................... A01R 13/53

(52) U.S. Cl. .................... 439/187; 439/921

(58) Field of Search .................... 439/187, 921, 439/206, 181–186, 491, 488; 29/564.1

(56) References Cited

U.S. PATENT DOCUMENTS

| | | | |
|---|---|---|---|
| H280 | 6/1987 | Thigpen | 429/7 |
| 1,783,062 | 11/1930 | Trencham . | |
| 1,997,081 | 4/1935 | Reynolds . | |
| 2,605,389 | 7/1952 | Kimball . | |
| 2,667,532 | 1/1954 | Ewer . | |
| 3,474,386 | 10/1969 | Link . | |
| 3,509,518 | 4/1970 | Phillips . | |
| 3,513,425 | 5/1970 | Arndt . | |
| 3,652,975 | 3/1972 | Keto . | |
| 3,663,928 | 5/1972 | Keto . | |
| 3,670,287 | 6/1972 | Keto . | |
| 3,678,432 | 7/1972 | Boliver . | |
| 3,720,904 | 3/1973 | De Sio . | |
| 3,826,860 | 7/1974 | De Sio et al. . | |
| 3,835,439 | 9/1974 | Yonkers . | |
| 3,860,322 | 1/1975 | Sankey et al. . | |

(List continued on next page.)

OTHER PUBLICATIONS

"Safe–T–Ring™ an anti–vacuum device 9U02Ring", Internet Advertisement, Chardon Electrical Components, Greeneville, TN (1998).

*Primary Examiner*—Neil Abrams
*Assistant Examiner*—Eugene G. Byrd
(74) *Attorney, Agent, or Firm*—Hoffmann & Baron, LLP

(57) ABSTRACT

Loadbreak connectors which are modified to reduce the probability of flashover upon disassembly operation of a loadbreak bushing insert from a power cable elbow connector. The loadbreak bushing insert and power cable elbow connector are mated with an interference fit between an elbow cuff and a transition shoulder portion of the loadbreak bushing insert. The bushing insert is provided with vents to vent a cavity formed between the elbow cuff and the transition shoulder portion of the bushing insert with ambient air to avoid a decrease in pressure within the connection region and avoid a decrease in the dielectric strength of the air therein thus preventing flashover. Preferably, the vents are provided on an elbow seating indicator band formed of a bright contrasting color on the bushing insert which, in addition to venting the cavity, serves to indicate whether the loadbreak connector is improperly assembled.

21 Claims, 6 Drawing Sheets

U.S. PATENT DOCUMENTS

| | | | |
|---|---|---|---|
| 3,915,534 | 10/1975 | Yonkers . | |
| 3,955,874 | 5/1976 | Boliver . | |
| 3,957,332 | 5/1976 | Labert, III . | |
| 3,960,433 | 6/1976 | Boliver . | |
| 4,067,636 | 1/1978 | Boliver et al. . | |
| 4,123,131 | 10/1978 | Pearce, Jr. et al. . | |
| 4,210,381 | 7/1980 | Borgstrom . | |
| 4,722,694 | 2/1988 | Makal et al. | 439/181 |
| 4,863,392 | 9/1989 | Borgstrom et al. | 439/185 |
| 5,213,517 | 5/1993 | Kerek et al. | 439/187 |
| 5,221,220 | 6/1993 | Roscizewski | 439/843 |
| 5,230,640 | 7/1993 | Tardif | 439/578 |
| 5,248,263 | 9/1993 | Sakurai et al. | 439/271 |
| 5,266,041 | 11/1993 | De Luca | 439/184 |
| 5,356,304 | 10/1994 | Colleran | 439/205 |
| 5,358,420 | 10/1994 | Cairns et al. | 439/206 |
| 5,393,240 | 2/1995 | Makal et al. | 439/187 |
| 5,433,622 | 7/1995 | Galambos | 439/282 |
| 5,492,487 | 2/1996 | Cairns et al. | 439/273 |
| 5,556,287 | 9/1996 | Kuhn et al. | 439/89 |
| 5,619,786 | 4/1997 | Baland | 29/450 |
| 5,641,306 | 6/1997 | Stepniak | 439/491 |
| 5,655,921 | 8/1997 | Makal et al. | 439/206 |
| 5,706,569 | 1/1998 | Miyamoto et al. | 29/564.1 |
| 5,765,595 | 6/1998 | Ballun | 137/881 |
| 5,769,274 | 6/1998 | Behar | 222/95 |
| 5,795,180 | 8/1998 | Siebens | 439/489 |
| 5,846,093 | 12/1998 | Muench, Jr. et al. | 439/89 |
| 5,857,862 | 1/1999 | Muench, Jr. et al. | 439/181 |

LOADBREAK CONNECTOR ASSEMBLY WHICH PREVENTS SWITCHING FLASHOVER

RELATED U.S. APPLICATIONS

This application is a continuation-in-part of U.S. application Ser. No. 08/902,749, filed on Jul. 30, 1997.

BACKGROUND OF THE INVENTION

1. Field of the Invention

The present invention relates to loadbreak connectors and more particularly to improvements in loadbreak connectors which prevent flashover upon switching (opening) the loadbreak connectors.

2. Description of the Prior Art

Loadbreak connectors used in conjunction with 15 and 25 KV switchgear generally include a power cable elbow connector having one end adapted for receiving a power cable and another end adapted for receiving a loadbreak bushing insert. The end adapted for receiving the bushing insert generally includes an elbow cuff for providing an interference fit with a molded flange on the bushing insert. This interference fit between the elbow cuff and the bushing insert provides a moisture and dust seal therebetween. An indicator band may be provided on a portion of the loadbreak bushing insert so that an inspector can quickly visually determine proper assembly of the elbow cuff and the bushing insert.

The elbow cuff forms a cavity having a volume of air which is expelled upon insertion of the bushing insert. During initial movement of the loadbreak connectors in the disassembly operation, the volume of air in the elbow cavity increases but is sealed off at the elbow cuff resulting in a decrease in pressure within the cavity. The dielectric strength of the air in the cavity decreases with the decrease in air pressure. Although this is a transient condition, it occurs at a critical point in the disassembly operation and can result in dielectric breakdown of the opening interface causing a flashover or arc to ground. The occurrence of flashover is also related to other parameters such as ambient temperature, the time relationship between the physical separation of the connectors and the sinusoidal voltage through the loadbreak connectors.

Another reason for flashover while switching loadbreak connectors, prior to contact separation, is attributed to a decrease in dielectric strength of the air along the interface between the bushing insert and the power cable elbow to ground. As earlier described, a decrease in air pressure is momentarily formed by the sealed cavity between the elbow cuff and the bushing insert flange. The lower pressure in the cavity reduces the dielectric strength of the air along the connection interface possibly resulting in flashover.

Accordingly, it would be advantageous to design a loadbreak connector system including a power cable elbow and a loadbreak bushing insert which reduce or prevent the possibility of a flashover upon switching of the connectors.

OBJECTS AND SUMMARY OF THE INVENTION

It is an object of the invention to provide loadbreak connectors, which upon disassembly under load, prevent flashover from occurring at the interface of the connectors.

It is a further object of the invention to provide a power cable elbow connector and loadbreak bushing insert having a modified interface which is vented to prevent a decrease in air pressure therebetween and a resulting decrease in dielectric strength of the air causing a flashover.

It is still a further object of the invention to provide a power cable elbow connector and loadbreak bushing insert having an indicator band formed on the bushing insert and which is vented to prevent a decrease in air pressure therebetween and a resulting decrease in dielectric strength of the air causing a flashover.

It is yet another object of the present invention to provide a power cable elbow connector and a loadbreak bushing insert in which the distance from the energized electrode of the elbow to the ground electrode of the bushing insert is increased to avoid flashover.

It is still a further object of the present invention to provide a power cable elbow connector having an electrode or probe in which a portion of the electrode is covered with an insulating material to increase the flashover distance to ground.

It is yet another object of the present invention to provide a power cable elbow connector in which the bushing insert receiving opening includes, at its upper end, an insulating material positioned within the conductive insert portion of the elbow connector to thereby increase the distance between an energized electrode and ground.

In accordance with one form of the present invention, the loadbreak connector assembly includes a power cable elbow having a conductor receiving end and a loadbreak bushing insert insertion end and a loadbreak bushing insert. The loadbreak bushing insert includes an insulative outer housing having an axial bore therethrough, a conductive member positioned within the axial bore of the housing and wherein the outer housing is formed in three sections. The first end section is dimensioned to be seated in a universal bushing well, a second end section is dimensioned for insertion into the power cable elbow connector and the third section is a mid-section which is radially larger than the first and second end sections. The mid-section preferably includes a conductive portion for attachment of a ground conductor and a transition shoulder portion between the second end section and the mid-section. In order to prevent a pressure drop in a cavity formed between an elbow cuff of the elbow connector and the mid-section of the bushing insert, the transition shoulder portion of the bushing insert includes means for venting an annular top surface of the transition shoulder portion with the longitudinal side surface of the housing mid-section.

The venting means may be formed in a number of different ways including at least one vent groove formed in the transition shoulder portion of the outer housing, at least one through hole from the annular top surface to the longitudinal side surface, a circumferential groove formed in a transition shoulder portion, or a plurality of raised ribs circumferentially spaced along the transition shoulder portion of the outer housing. Furthermore, the cavity formed between the elbow cuff and bushing insert transition shoulder portion may include an elastomeric flap which fills the cavity therebetween preventing any pressure drop in the cavity.

In one embodiment, the venting means is included on an elbow seating indicator band formed on the transition shoulder portion of the bushing insert. Upon proper mating of the elbow to the loadbreak bushing, the indicator band is completely hidden from view under the elbow cuff. The transition shoulder portion is formed with a step or recess and the indicator band, molded or extruded of a contrasting bright color is placed in the step or recess. Thus, the band serves the dual purpose of indicating proper assembly of the elbow cuff and the bushing insert while also providing venting for the cavity formed therebetween.

Alternatively, the combination of a power cable elbow and loadbreak bushing insert may include a means for increasing the distance from an energized electrode to ground in order to prevent flashover during disassembly operation. The power cable elbow connector includes a conductor receiving end, loadbreak bushing insert receiving end and a conductive member extending from the cable receiving end to the bushing insert receiving end. The bushing insert receiving end includes an open end portion having an elbow cuff therearound. The loadbreak bushing insert includes an insulative outer housing having an axial bore therethrough and a conductive member positioned within the axial bore. The outer housing includes a power cable elbow insertion end and a mid-section dimensionally radially larger than the power cable elbow insertion end of the outer housing. The outer housing includes a transition shoulder portion between the mid-section and elbow insertion end for providing an interference-fit sealing relationship with the elbow cuff upon insertion of the bushing insert into the power cable elbow. The transition shoulder portion of the bushing insert includes vent means in accordance with the present invention for providing fluid communication between a cavity defined by the elbow cuff and the transition shoulder portion of the bushing insert upon disassembly therebetween and a location outside the mating elbow cuff and transition shoulder portion to prevent a pressure decrease within the cavity and flashover due to a decrease in dielectric strength of the air therein.

The mid-section of the bushing insert includes a conductive portion having least one ground connection terminal thereon for attachment of a ground conductor. In accordance with the present invention, the conductive portion is partially coated with an insulative material between the ground connection terminal and the transition shoulder portion thereby increasing the distance an arc from an energized electrode must travel to ground. Alternatively, the power cable elbow includes a probe or electrode for electrically contacting the conductive member of the bushing insert upon assembly. The probe includes a portion thereof having an insulative material surrounding the probe which extends into the bushing insert upon assembly of the power cable elbow and bushing insert. Accordingly, the distance an arc must travel from the energized electrode to ground is increased by the length of the insulative material surrounding the probe. Furthermore, the power cable elbow includes a conductive insert at the upper end of the bushing insert receiving space. The conductive insert may include insulative material at the upper portion of the bushing insert receiving space to provide an increased distance between an energized electrode and ground.

A preferred form of the loadbreak connectors including a power cable elbow connector, a loadbreak bushing insert and a seating indicator band, as well as other embodiments, objects, features and advantages of this invention, will be apparent from the following detailed description of illustrative embodiments thereof, which is to be read in conjunction with the accompanying drawings.

DETAILED DESCRIPTION OF ILLUSTRATIVE EMBODIMENTS

Figure 1:
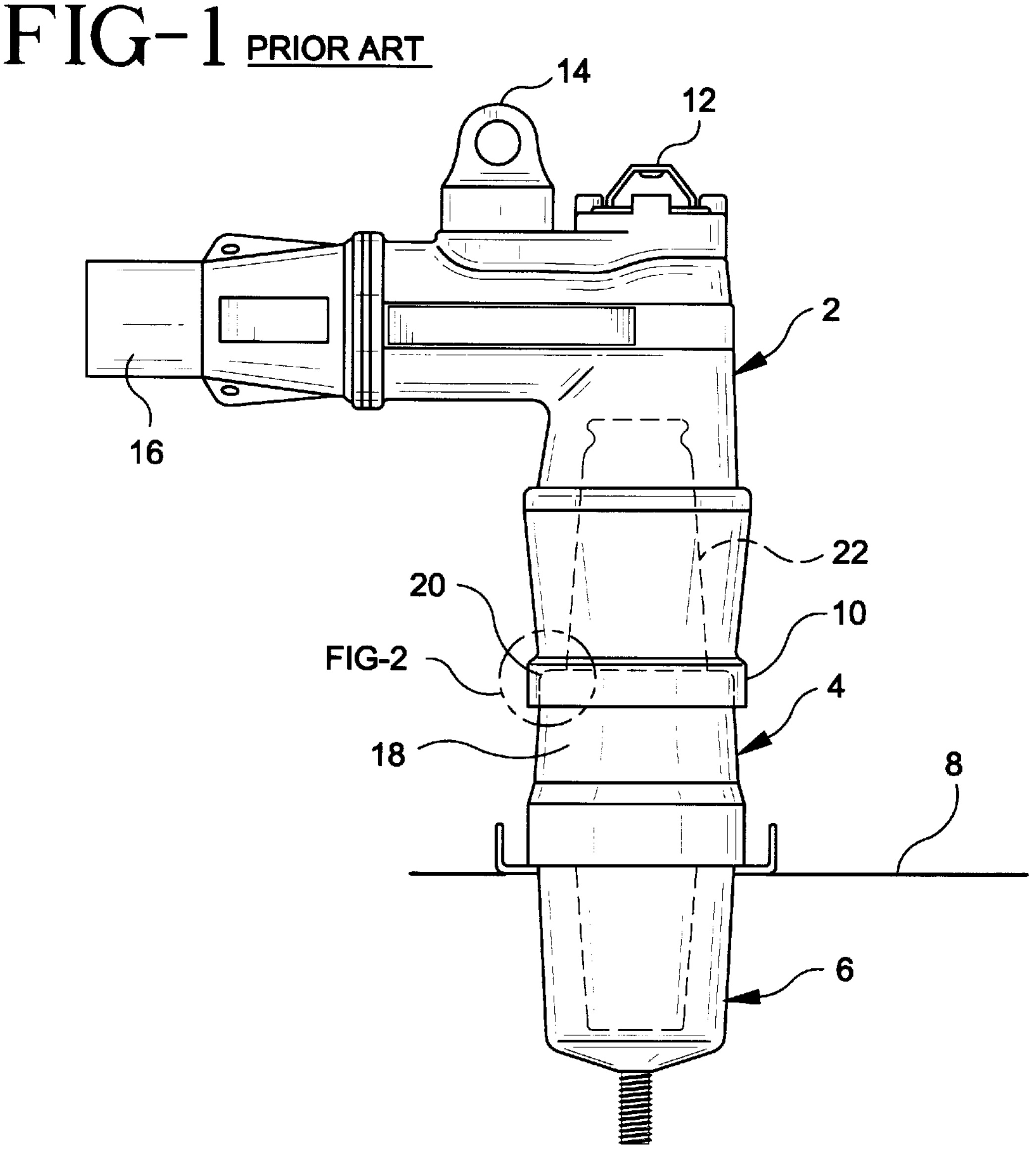
FIG-1 PRIOR ART
FIG. 1 is a side elevation view of prior art loadbreak connectors, namely, a power cable elbow, a loadbreak bushing insert and a universal bushing well.
Figure 2:
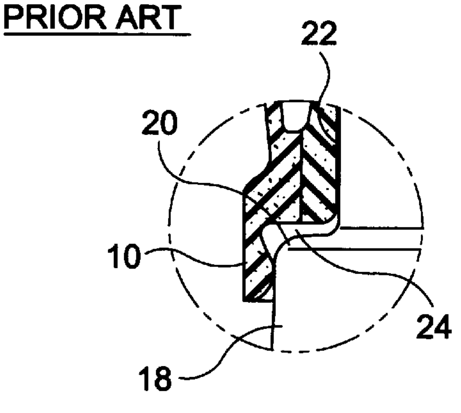
FIG-2 PRIOR ART
FIG. 2 is an enlarged cross-sectional view of the mating interface between the prior art power cable elbow and loadbreak bushing insert illustrated in FIG. 1.

Referring to FIGS. 1 and 2, prior art loadbreak connectors are illustrated. In FIG. 1, a power cable elbow connector 2 is illustrated coupled to a loadbreak bushing insert 4 which is seated in a universal bushing well 6. The bushing well 6 is seated on an apparatus face plate 8. The power cable elbow connector 2 includes a first end adapted for receiving a loadbreak bushing insert 4 and having a flange or elbow cuff 10 surrounding the open receiving end thereof. The power cable elbow connector also includes an opening eye 12 for providing hot-stick operation and a test point 14 which is a capacitively coupled terminal used with appropriate voltage sensing devices. A power cable receiving end 16 is provided at the opposite end of the power cable elbow connector and a conductive member extends from the receiving end to the bushing insert receiving end for connection to a probe insertion end 36 of the bushing insert.

Referring still to FIGS. 1 and 2, the loadbreak bushing insert includes a mid-section 18 having a larger dimension than the remainder of the bushing insert. The mid-section 18 includes a transition shoulder portion 20 between the mid-section and an upper section 22 which is inserted into the power cable elbow connector 2. As more clearly illustrated in FIG. 2 which is an enlarged cross-section of the connector interface, the elbow cuff 10 and side portion of the mid-section for the bushing insert provides a moisture and dust seal through an interference fit therebetween. Upon initial movement of the power cable elbow connector away from the bushing insert during a disassembly operation, a cavity 24 defined by the elbow cuff 10 and transition shoulder portion 20 of the bushing insert increases in volume. Due to the seal between the elbow cuff and the transition portion of the bushing insert, a decrease in pressure within the cavity 24 is created. The dielectric strength of the air in the cavity 24 decreases with the decrease in pressure. Although this is a transient condition, this decrease in dielectric strength occurs at a critical point in operation which may result in dielectric breakdown at the opening interface between the power cable elbow connector and the bushing insert causing a flashover, i.e. an arc to ground. The occurrence of such a flashover is also related to uncontrollable parameters such as ambient air temperature, the time relationship between the physical separation of the connectors and voltage.

In order to prevent flashover due to the decrease in dielectric strength of the air upon disconnecting the power cable elbow connector from a bushing insert under load, the present invention provides structure for either venting the cavity 24 created by the elbow cuff and bushing insert mid-section or, alternatively, increasing the distance between the energized electrode and ground thereby compensating for the reduced dielectric strength of the air at reduced pressure.

Referring now to FIGS. 3–8, the present invention provides for a means for venting the cavity defined by the power cable elbow cuff 10 and the bushing insert interface. More specifically , the vent means is provided such that when the power cable elbow connector is fully seated on the bushing insert, the elbow cuff provides a seal with the bushing insert mid-section 18. Upon disassembly and movement of the power cable elbow connector away from the bushing insert, the vent means is exposed, vents the cavity and equalizes the pressure in the cavity with the surrounding air pressure.

Figure 3:
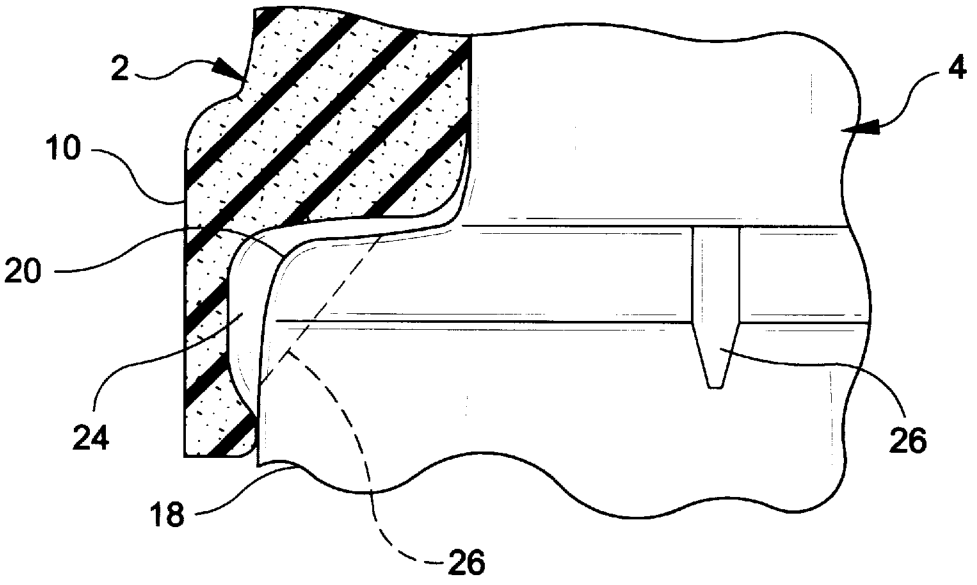
FIG. 3 is an enlarged cross-sectional view of the mating interface between the power cable elbow connector and a modified loadbreak bushing insert including vent grooves formed in accordance with the present invention.

Referring specifically to FIG. 3, which is a partial cross-sectional view illustrating the elbow cuff 10 and bushing insert interface, the transition shoulder portion 20 of the bushing insert is illustrated to include at least one vent groove 26 comprising an inclined cut-out portion of the bushing insert mid-section. Upon movement of the elbow cuff 10 away from the bushing insert during disassembly, the lower portion of the vent groove 26 is exposed to ambient air pressure creating fluid communication with the cavity 24 and equalizing the pressure within the cavity with that of the ambient air pressure surrounding the connector assembly. Accordingly, the initial moisture and dust seal between the interference fit of the elbow cuff and the bushing insert are preserved and, upon a disassembly operation of the power cable elbow connector 2 from the bushing insert 4, the cavity formed therebetween is vented.

Figure 4:
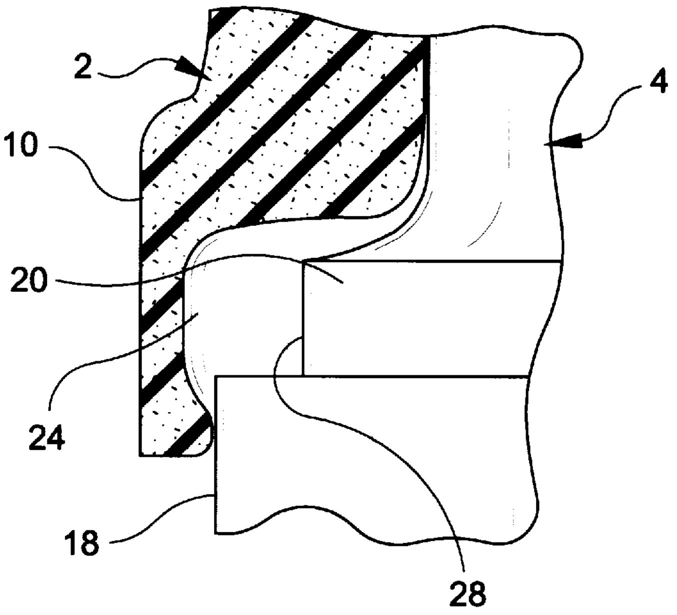
FIG. 4 is an enlarged cross-sectional view of the mating interface between the power cable elbow connector and a modified loadbreak bushing insert including a circumferential vent groove formed in accordance with the present invention.
Figure 5:
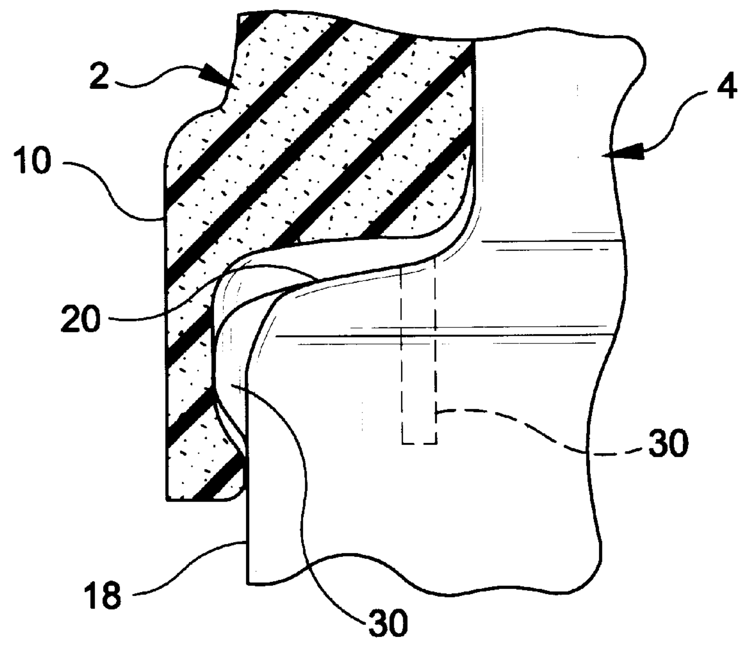
FIG. 5 is an enlarged cross-sectional view of the mating interface between the power cable elbow connector and a modified loadbreak bushing insert including raised ribs formed in accordance with the present invention.
Figure 6:
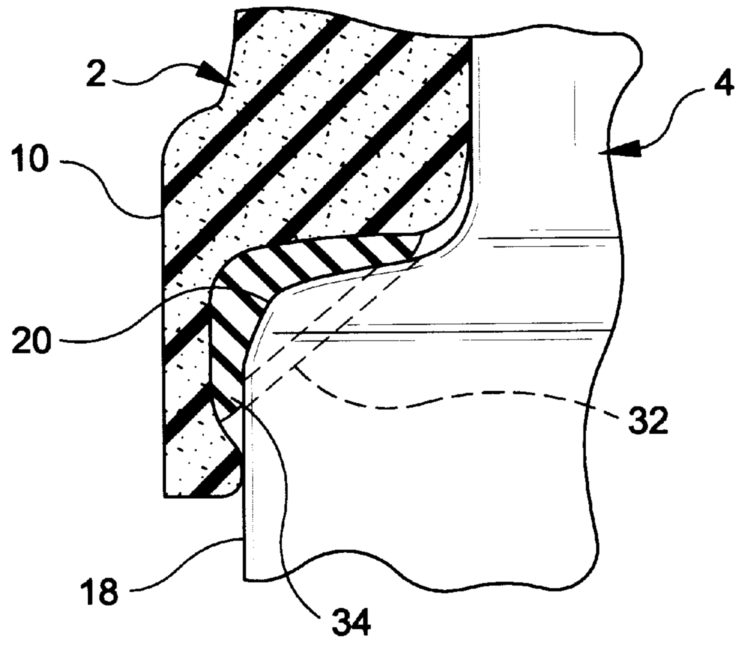
FIG. 6 is an enlarged cross-sectional view of the mating interface between the power cable elbow connector and a modified loadbreak bushing insert including through-hole vents or an elastomeric flap formed in accordance with the present invention.

Alternative methods of venting the cavity 24 are illustrated in FIGS. 4, 5 and 6 which are also partial cross-sectional views of the interface between the elbow cuff 10 and the bushing insert. More specifically, FIG. 4 illustrates a bushing insert transition shoulder which is stepped so as to provide a circumferential groove 28 along a top portion of the bushing interface. Upon disassembly, the circumferential groove 28 opens the cavity to outside ambient air pressure preventing a decrease in dielectric strength of the air within the cavity.

FIG. 5 illustrates a further alternative embodiment in which the bushing insert includes at least one rib 30 substantially formed in the transition shoulder portion 20 of the bushing insert. More specifically, the rib 30, upon disassembly, forces the elbow cuff 10 to expand in a radially outward direction thereby allowing the cavity 24 to be in fluid communication with ambient air surrounding the connector assembly. A further alternative embodiment to vent the cavity formed between the elbow cuff and the bushing insert interface illustrated in FIG. 6 includes at least one through hole 32 from a side portion of the bushing insert to the annular top surface of the transition shoulder portion. Upon disassembly operation, the through hole allows the cavity 24 to vent to the outside air preventing a decrease in pressure in the cavity.

Each of the above methods include modifying the loadbreak bushing insert to allow venting of the cavity formed between the bushing insert and the elbow cuff. Alternatively, the power cable elbow connector 2 may be modified to prevent a decrease in air pressure in the cavity. It is advantageous to maintain the moisture and dust seal at the elbow cuff and bushing insert interface. Accordingly, although removal of the elbow cuff would prevent any pressure build-up in the cavity, this would also allow moisture and dust to accumulate at the base of the interface and may lead to a flashover situation. A viable solution, as illustrated in FIG. 6, would be to eliminate the through hole vent 32 in the bushing insert and place within the cavity an elastomeric material 34 which would effectively eliminate the cavity and expand upon the disassembly operation. Naturally, the elastomeric material would be designed to fill the cavity but not place undue force at the bushing insert interface so that the power cable elbow connector does not back-off the interface when assembled. A suitable elastomeric material may consist of rubber. The elastomeric material may be in the form of a solid material or a flap which extends from the downward leg of the elbow cuff to the horizontal leg of the cuff.

Figure 7:
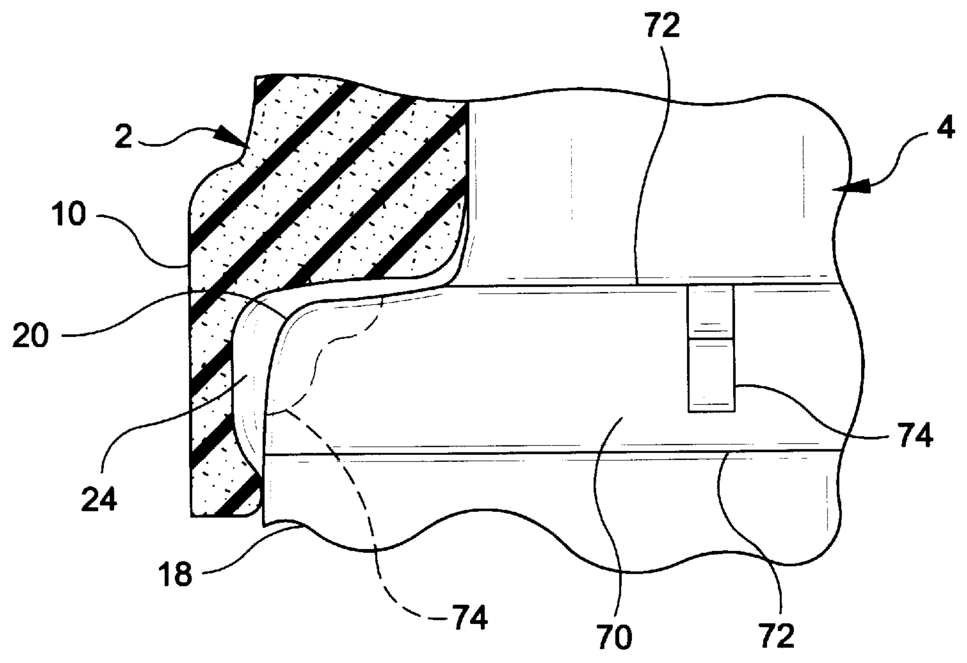
FIG. 7 is an enlarged cross-sectional view of the mating interface between the power cable elbow connector and a modified loadbreak bushing insert including a seating indicator band having vent grooves formed in accordance with the present invention.
Figure 8:
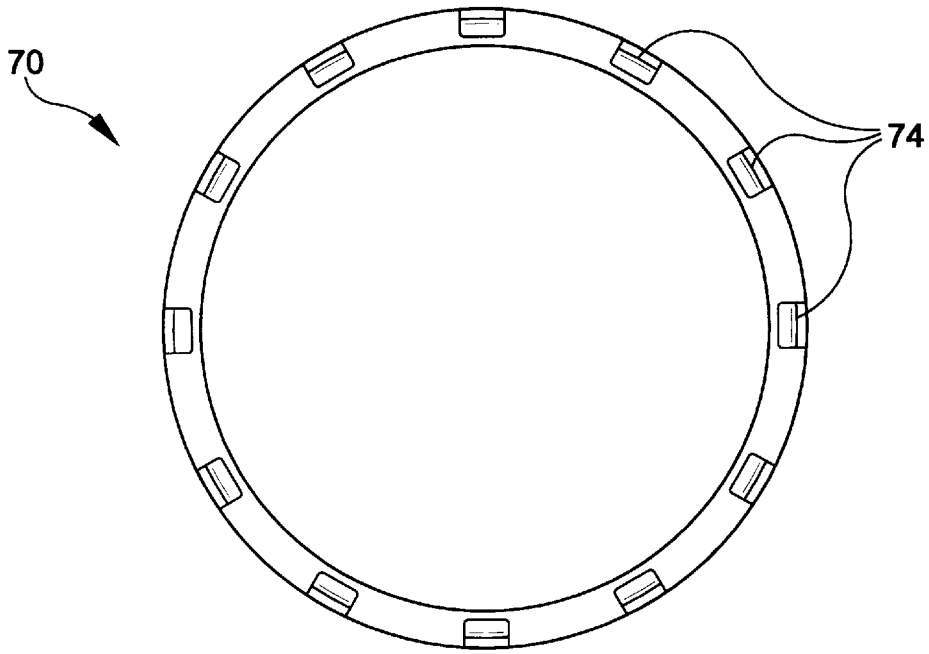
FIG. 8 is a top plan view of a seating indicator band having vent grooves formed in accordance with the present invention.

Referring now to FIGS. 7 and 8, in a further embodiment of the present invention, the venting means are provided on an elbow seating indicator band 70 which is formed on the transition shoulder portion 20 of the bushing insert 18. The indicator band 70 is an annular ring, having a bright color, such as red, yellow or the like so as to contrast the color of the bushing insert 18. The indicator band 70 may be molded or extruded from any suitable rubber or plastic material. The transition shoulder portion 20 is formed with a step or recess 72 and the indicator band is mounted in the step or recess. The band 70 is seated on the transition shoulder portion 20 of the bushing insert 18 such that when the loadbreak connector is properly assembled, the elbow cuff 10 completely obscures the band from sight providing visual indication of proper assembly. If the loadbreak bushing 18 is not fully inserted within the elbow cuff 10, the bright color of the indicator band 70 is visible bringing attention to the improper assembly. An elbow seating indicator band of this type is disclosed in commonly owned U.S. Pat. No. 5,795,180, the disclosure of which is incorporated herein by reference. However, the indicator band of the present invention includes a venting means, such as a plurality of vent grooves 74, formed in spaced relation around the circumference of the band 70. Similar to the venting means described above, upon movement of the elbow cuff 10 away from the bushing insert 18 during disassembly, the lower portion of the vent grooves 74 is exposed to ambient air pressure creating fluid communication with the cavity 24 and equalizing the pressure within the cavity with that of the ambient air pressure surrounding the connector assembly. While the indicator band 70 of FIGS. 7 and 8 is shown with venting grooves 74, any of the other venting means as described above with respect to the transition shoulder portion, i.e., circumferential groove, raised ribs, venting through holes or an elastomeric flap may be provided on the indicator band 70.

Figure 9:
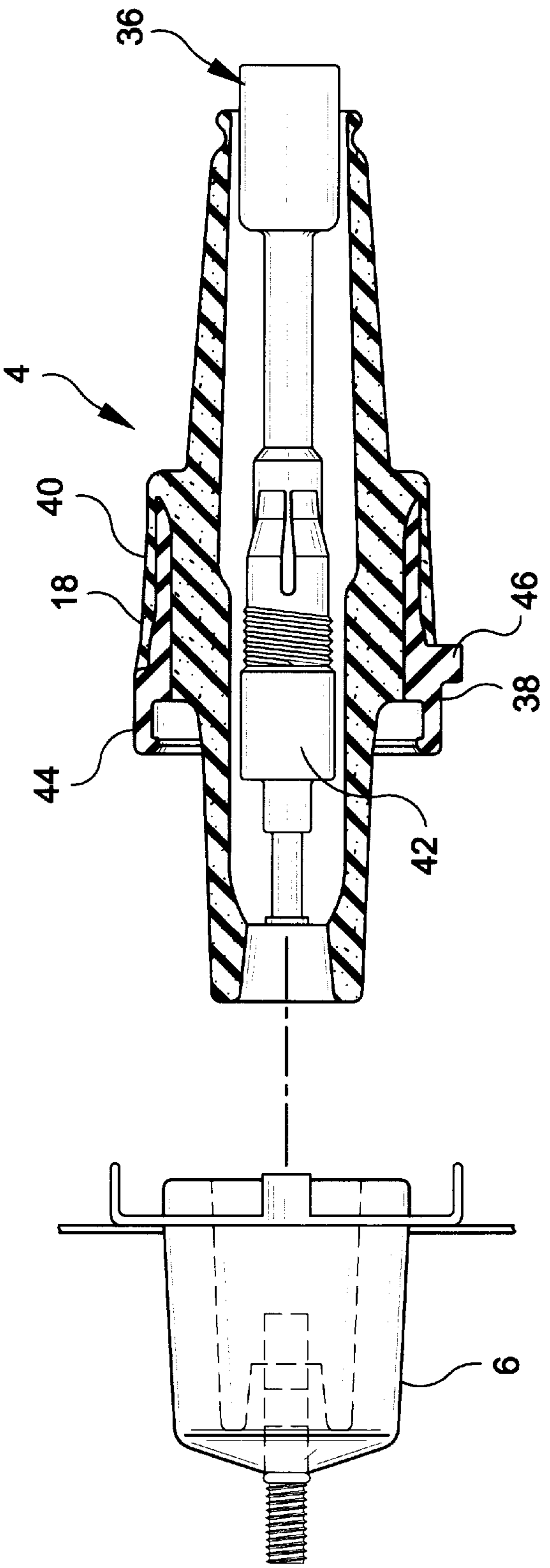
FIG. 9 is a cross-sectional view of a universal bushing well and a loadbreak bushing insert including an insulation material covering a substantial portion of the ground electrode formed in accordance with the present invention.

As previously mentioned, yet another alternative to preventing flashover upon disconnection of a power cable elbow connector from a loadbreak bushing entails increasing the distance between the energized electrode and the ground of the bushing insert. Referring to FIG. 9, which is a cross-sectional view of a loadbreak bushing insert 4 and universal bushing well 6, the distance to ground from the probe insertion end 36 to the ground electrode 38 is increased by adding a layer of insulating layer 40 around a substantial portion of the ground electrode 38. The loadbreak bushing insert 4 includes a current carrying path 42 and a flange for coupling the bushing insert to the bushing well 6. In the prior art devices, the ground electrode 38 extends substantially over the entire length of the mid-section 18 of the bushing insert. Accordingly, the distance from the ground electrode of the insert to the energized probe electrode essentially comprises the distance from the transition shoulder portion of the bushing insert to the probe insertion end 36.

The present invention increases this flashover distance from the energized electrode to the ground electrode by placing an insulating layer 40 over a substantial portion of the ground electrode. Accordingly, the flashover distance is increased from the transition shoulder portion 20 to approximately the grounding eye 46 of the ground electrode 38. The grounding eye 46 provides for convenient attachment of a ground conductor. A suitable material for the insulation portion of the loadbreak bushing insert is a peroxide-cured, synthetic rubber known and referred to in the art as EPDM insulation. Furthermore, the ground electrode may be formed from a molded conductive EPDM.

Figure 10:
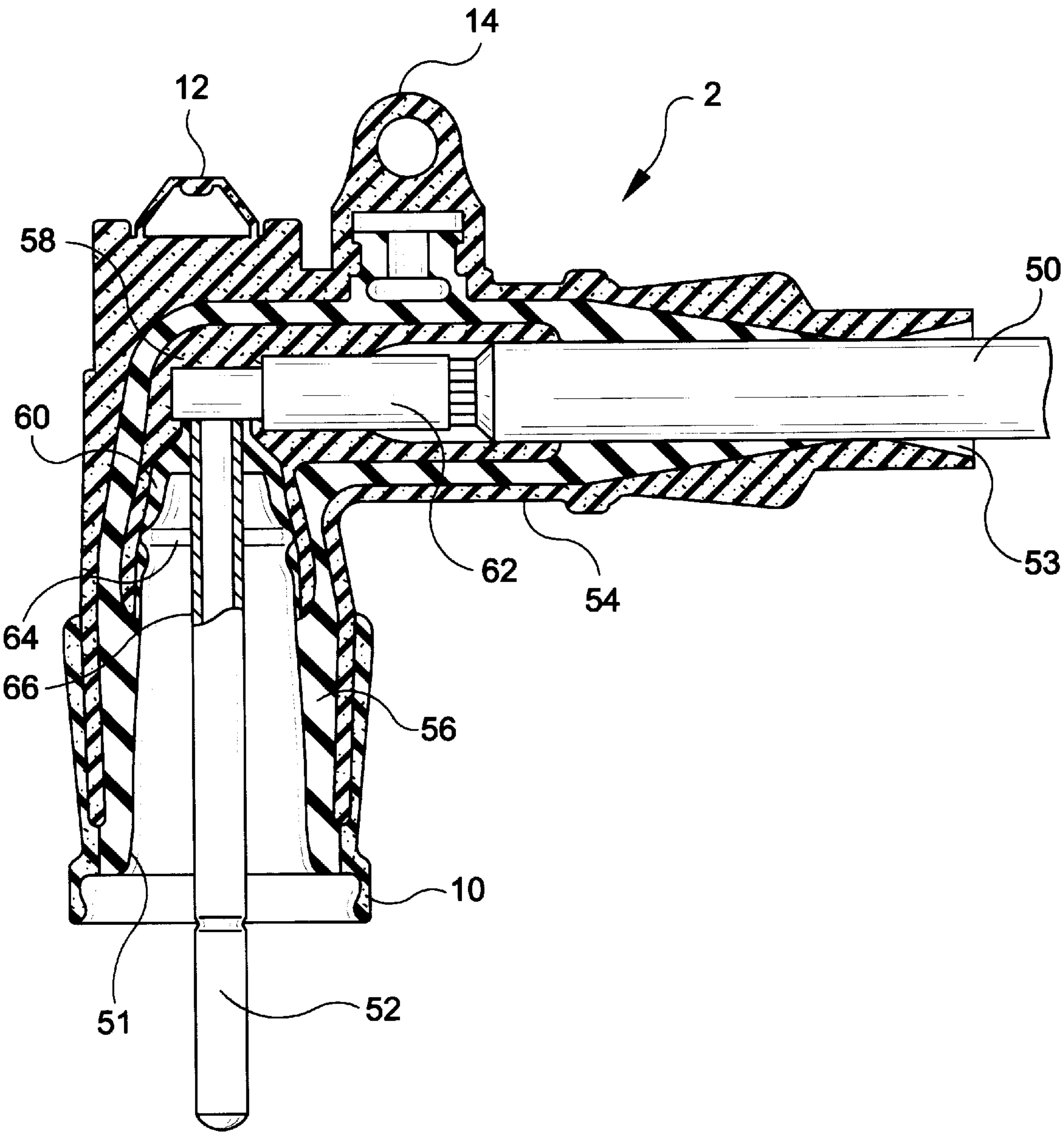
FIG. 10 is a cross-sectional view of a modified power cable elbow connector including an electrode having an insulative coating and an insulation material within the conductive insert of an upper portion of the loadbreak bushing receiving space.

Alternatively, the power cable elbow connector 2 may be modified from the prior art elbows to increase the distance between the energized electrode and ground. FIG. 10 is a cross-sectional view of a modified power cable elbow in accordance with the present invention. The power cable elbow connector 2 includes a conductor receiving end 53 having a conductor 50 therein. The other end of the power cable elbow is a loadbreak bushing insert receiving end having a probe or energized electrode 52 positioned within a central opening of the bushing receiving end. The probe 52 is connected via a cable connector to the cable 50. The power cable elbow includes a shield 54 formed from conductive EPDM. Within the shield 54, the power cable elbow comprises an insulative inner housing 56 which defines the bushing insert receiving opening 51.

In prior art devices, the power cable elbow connector includes a conductive insert which surrounds the connection portion 62 of the cable and an upper portion of the bushing insert receiving space. In order to increase the distance between the energized electrode or probe 52 and ground which is located on the bushing insert and positioned near the elbow cuff 10, the present invention adds an insulating layer placed over portions of the energized electrode. In a first embodiment, insulating portion 60 is provided in the upper end of the bushing insert receiving opening within the conductive insert 58. The insulating portion 60 extends from a compression lug 62 for receiving the cable 50 to a position below the locking ring 64 which engages a bushing insert locking groove to secure connection of the bushing insert within the power cable elbow connector. Accordingly, in order for flashover to occur, the arc would have to extend over the insulating layer 60 and further over insulating layer 56 to reach the ground electrode of the bushing insert.

Alternatively, the distance between the energized electrode 52 and the ground electrode 38 of the bushing insert may be further increased by covering a portion of the energized electrode or probe 52 to increase the flashover distance. As illustrated in FIG. 10, the probe 52 includes an upper portion having an insulating layer 66 surrounding the upper portion thereof. Accordingly, in order for a flashover to occur, the arc must first traverse the insulating material surrounding the upper portion of the electrode 66, then traverse the upper insulating portion 60 within the conductive insert 58 and the insulating material 56 to reach the ground electrode 38 on the bushing insert. Thus, the flashover distance is increased by the distance that the insulating material covers the electrode and further by the distance from the top of the bushing insert receiving opening to the bottom portion of the conductive insert which, in the prior art, was a conductive path. Naturally, the power cable elbow connector may be modified with either the probe insulation 66, the insulation material 60 within the conductive insert or both in combination to increase the distance between the energized electrode and ground. By increasing the flashover distance, the likelihood of flashover due to a decrease in air pressure around the sealed interface between the power cable elbow connector 2 and loadbreak bushing insert 4 due to a decrease in dielectric strength of the air around the interface is significantly decreased.

The loadbreak connector assembly of the present invention including the modified bushing insert and modified power cable elbow connector greatly reduces the likelihood of flashover upon disassembly operation. Flashover is prevented by either providing venting means at the interference fit interface between the bushing insert and the power cable elbow connector or increasing the flashover distance that an arc has to travel to ground in order to prevent flashover. The increase in flashover distance is accomplished by providing additional insulating material on either the energized electrode, within the conductive insert or both.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A loadbreak bushing insert comprising:

an insulative outer housing having an axial bore therethrough, the housing including three sections, a first end section being dimensioned to be sealed in a bushing well, a second end section being dimensioned for insertion into a power cable elbow connector and a mid-section being radially larger than the first and second end sections, and the outer housing having a transition shoulder portion between the second end section and the mid-section;

a conductive member positioned within the axial bore of the housing; and an indicator band provided on the transition shoulder portion of the housing, the band being formed of a different colored material than that of the outer housing, the band further including at least one vent for venting an annular top surface of the transition shoulder portion with a longitudinal side surface of the housing mid-section.

2. A loadbreak bushing insert as defined in claim 1, wherein the at least one vent comprises at least one vent groove formed in the indicator band.

3. A loadbreak bushing insert as defined in claim 1, wherein the at least one vent comprises at least one through hole from the annular top surface of the transition shoulder portion to the longitudinal side surface of the housing mid-section.

4. A loadbreak bushing insert as defined in claim 1, wherein the at least one vent comprises a circumferential groove formed in the indicator band.

5. A loadbreak bushing insert as defined in claim 1, wherein the at least one vent comprises a plurality of raised ribs circumferentially spaced along an outer surface of the indicator band.

6. A loadbreak bushing insert as defined in claim 1, wherein the indicator band is positioned in a recess formed on the transition shoulder portion.

7. In combination:

a power cable elbow connector including a conductor receiving end and a loadbreak bushing insert receiving end, the elbow connector further including a conductive member extending from the cable receiving end to the bushing insert receiving end, the bushing insert receiving end including an open end portion having an elbow cuff therearound;

a loadbreak bushing insert including an insulative outer housing having an axial bore therein and a conductive member positioned within the axial bore, wherein the outer housing includes a power cable elbow insertion end and a mid-section dimensionally radially larger than the power cable elbow insertion end of the outer housing, the outer housing having a transition shoulder portion between the mid-section and elbow insertion end for providing an interference-fit sealing relationship with the elbow cuff upon insertion of the bushing insert into the power cable elbow connector; and an indicator band provided on the transition shoulder portion of the outer housing of the bushing insert, the band being formed of a different colored material than that of the outer housing and including a vent for providing fluid communication between a cavity defined by the elbow cuff and transition shoulder portion of the insert upon disassembly therebetween and a location outside the mating elbow cuff and transition shoulder portion of the insert.

8. The combination as defined in claim 7, wherein the indicator band is visually obscured by the elbow cuff of the power cable elbow connector when the insertion end of the loadbreak bushing insert is fully inserted within the bushing insert receiving end of the power cable elbow connector.

9. The combination as defined in claim 7, wherein the vent comprises at least one vent groove formed in the indicator band.

10. The combination as defined in claim 7, wherein the vent comprises at least one through hole formed in the indicator band from an annular top surface of the band to a longitudinal side surface of the band.

11. The combination as defined in claim 7, wherein the vent includes a circumferential groove formed in the indicator band.

12. The combination as defined in claim 7, wherein the vent comprises a plurality of raised ribs circumferentially spaced along an outer surface of the indicator band.

13. A method for venting a chamber formed between a power cable elbow connector and a loadbreak bushing insert of a loadbreak connector assembly comprising the steps of:

providing a loadbreak bushing insert comprising a first end section being dimensioned to be sealed in a bushing well, a second end section being dimensioned for insertion into the power cable elbow connector, a mid-section being radially larger than the first and second end sections and a transition shoulder portion positioned between the second end section and the mid-section;

forming a vent in the transition shoulder portion between a top surface of the transition shoulder portion and a longitudinal side surface of the mid-section;

disconnecting the power cable elbow and loadbreak bushing insert such that the chamber formed between the power cable elbow connector and the loadbreak bushing insert is vented by the vent to substantially prevent creating a low pressure dielectric air space.

14. The method as defined in claim 13, wherein the vent includes at least one vent groove formed in the transition shoulder portion of the loadbreak bushing insert.

15. The method as defined in claim 13, wherein the vent includes at least one through hole from the annular top surface to the longitudinal side surface.

16. The method as defined in claim 13, wherein the vent includes a circumferential groove formed in the transition shoulder portion of the loadbreak bushing insert.

17. The method as defined in claim 13, wherein the vent includes a plurality of raised ribs circumferentially spaced along the transition shoulder portion of the loadbreak busing insert.

18. The method as defined in claim 13, further comprising the step of providing an indicator band positioned on the transition shoulder portion, the band being formed of a different colored material than that of the loadbreak bushing insert to provide visual indication of a proper connection between the loadbreak bushing insert and the power cable elbow.

19. The method as defined in claim 18, further comprising the step of forming a recess in the transition shoulder portion for positioning the indicator band therein.

20. The method as defined in claim 18, wherein the indicator band is visually obscured by the power cable elbow connector when the second end section of the loadbreak bushing insert is fully inserted within the power cable elbow connector.

21. The method as defined in claim 18, wherein the vent is formed in the indicator band.

* * * * *